Dec. 23, 1941.   H. G. SCHWARZ   2,267,048
CENTRIFUGAL EXTRACTOR AND METHOD OF EXTRACTION
Original Filed Dec. 17, 1935   3 Sheets-Sheet 3
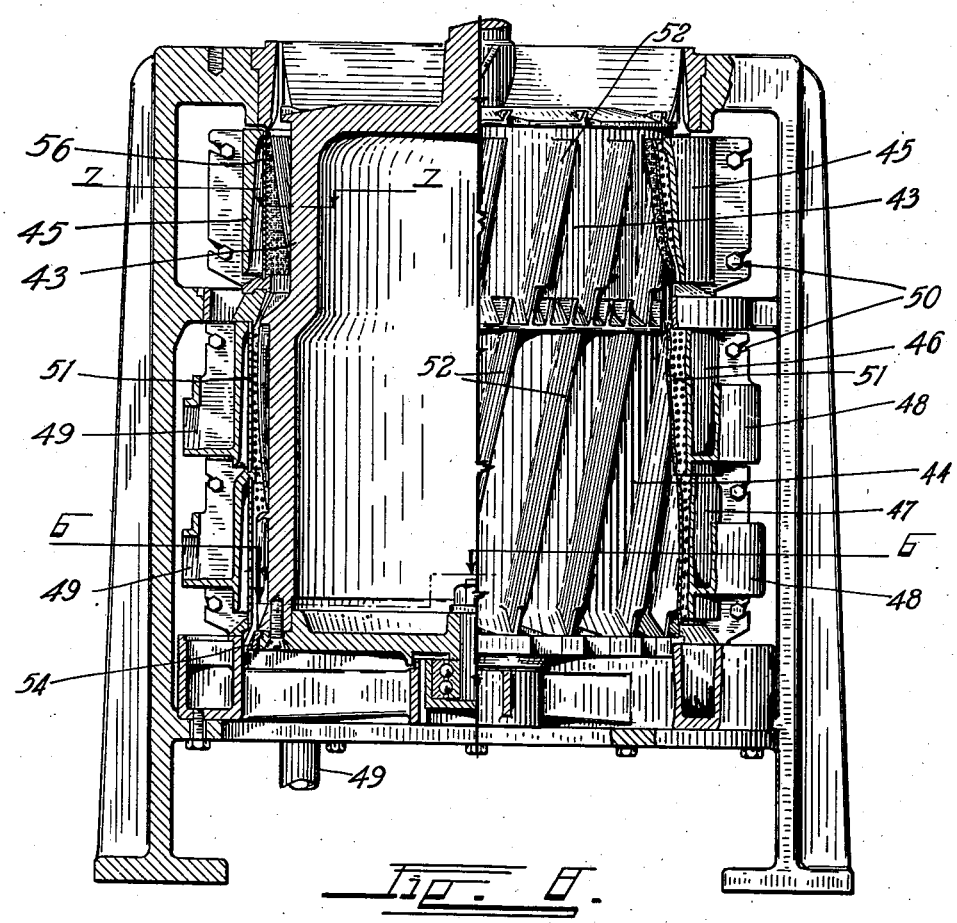
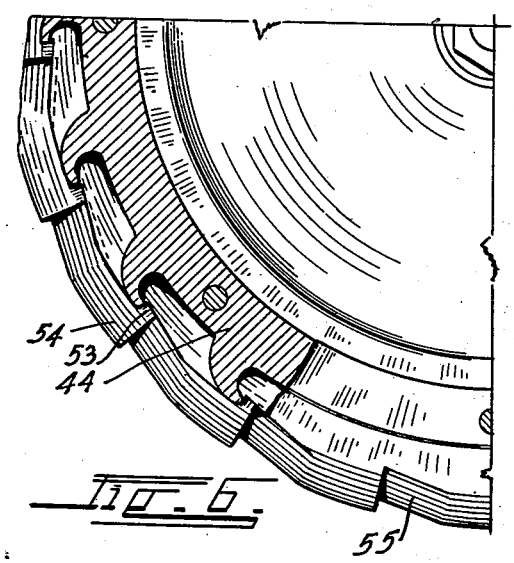
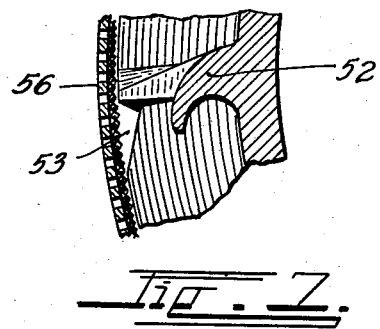
INVENTOR.
HENRY G. SCHWARZ
BY
ATTORNEY.

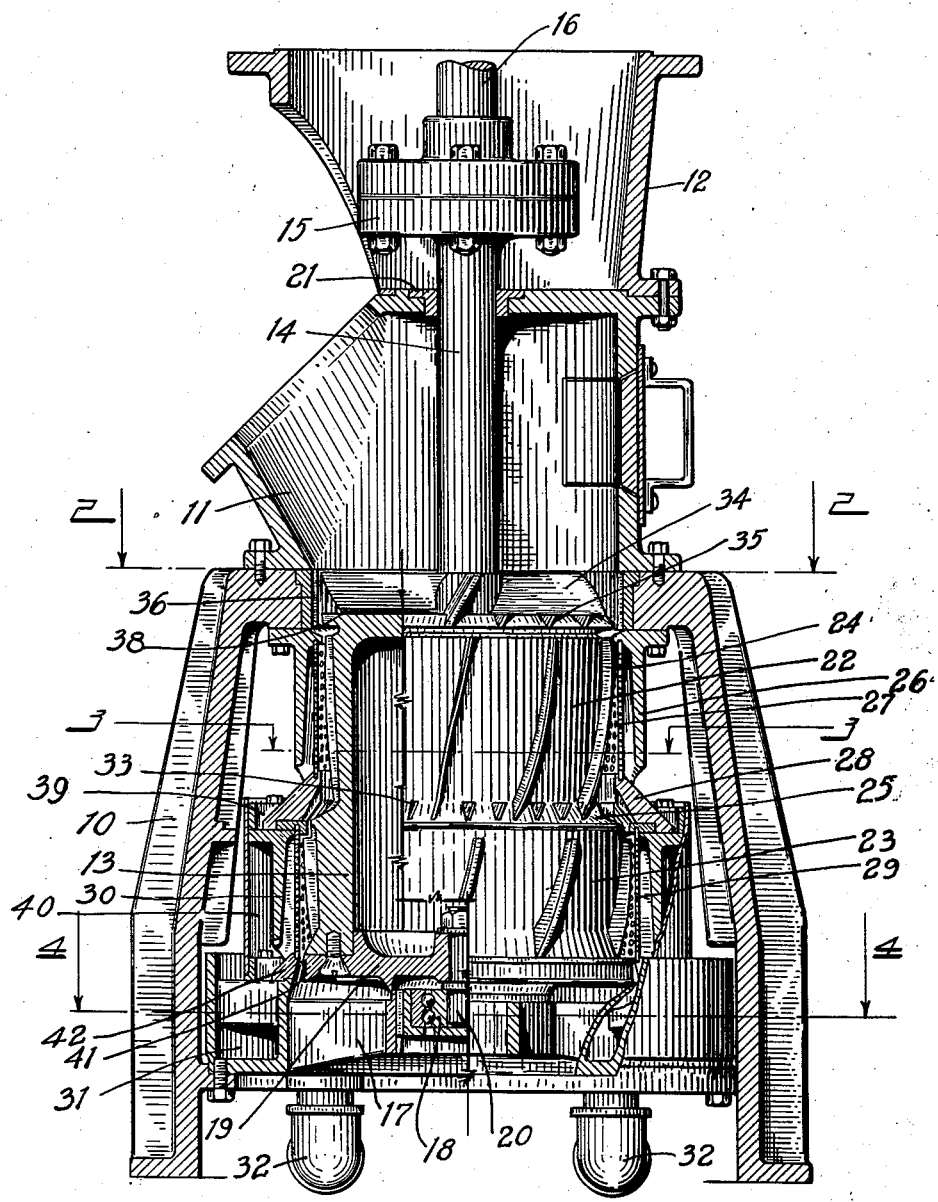

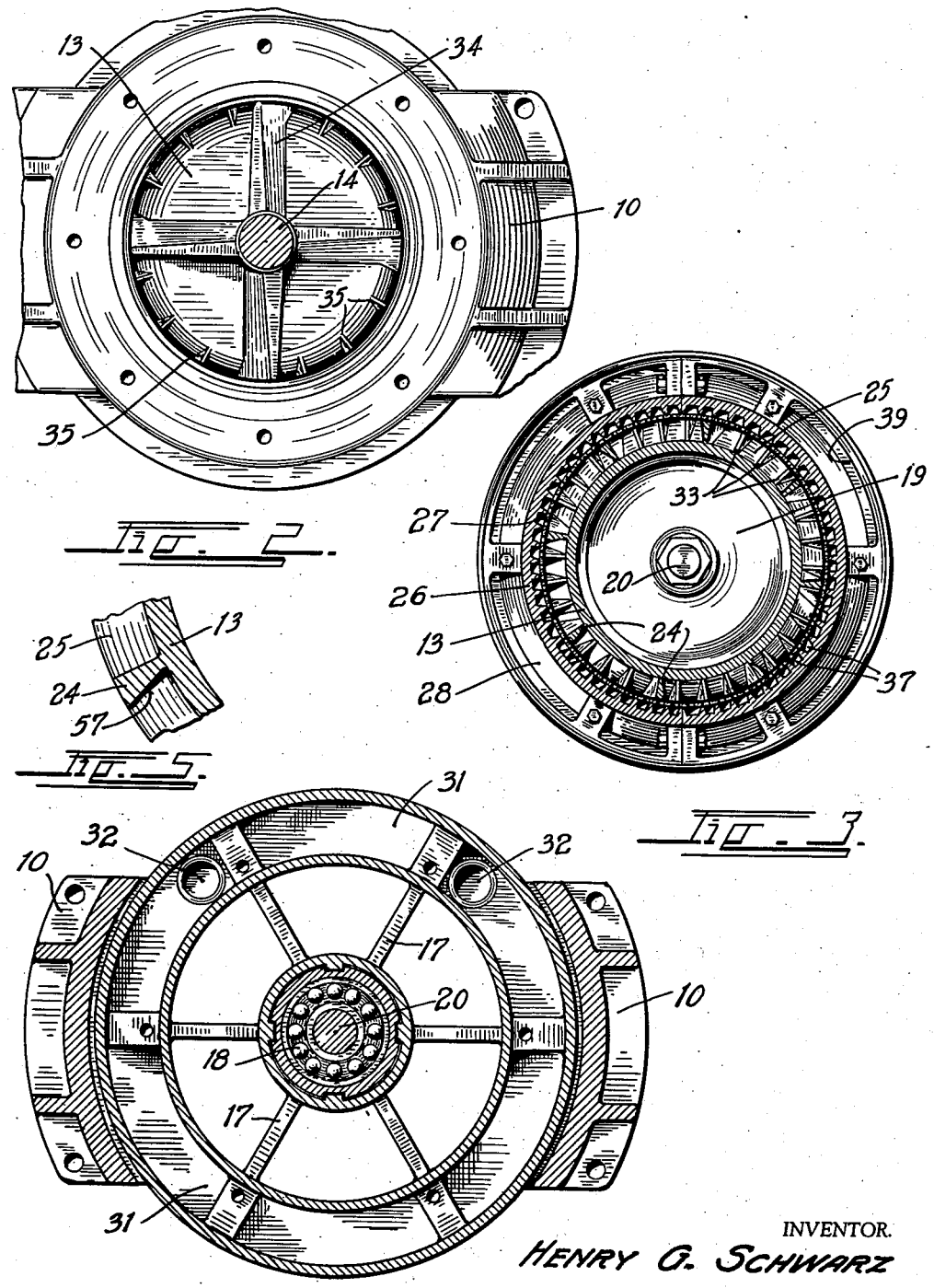

Patented Dec. 23, 1941

2,267,048

UNITED STATES PATENT OFFICE 2,267,048

CENTRIFUGAL EXTRACTOR AND METHOD OF EXTRACTION

Henry G. Schwarz, Denver, Colo., assignor to The Schwarz Engineering Company, Inc., San Francisco, Calif., a corporation of Nevada Application December 17, 1935, Serial No. 54,795
Renewed May 3, 1937

33 Claims. (Cl. 146—76)

This invention relates to a juice extractor and more particularly to a large commercial type of extractor for use in plants packing tomato juice, pineapple juice, and other fruit juices.

All known fruit juice extractors have the fault of expelling with the juice too large an amount of pulp and other fiber solids, and other special processes are required to produce either a clear juice or a juice containing the desired amount of pulp or solids.

Pulp extractors expel the entire pulp together with the juice and produce an extract of coarse, heavy density—rather a mush, making it difficult to extract from this a juice with a limited amount of fine solids.

An object of the present invention is to provide a continuous machine which will produce in one continuous process any desired quality of juice containing any desired amount of pulp or solids of sufficient fineness to remain suspended in the juice, thus uniformly retaining the original flavor in the juices.

Another object of the invention is to provide a continuous machine which will, if desired, produce several different grades of juice uniformly varying in the amount of contained solids. When used upon tomatoes, for example, the machine will, in one process, produce two or three grades of tomato juice, and a heavy pulp without requiring later refining processes.

Other objects of the invention are to provide for more efficient, more thorough and quicker extraction of juices, for better and quicker comminution of juice-bearing materials including fruits, vegetables and the like, more thorough and quicker opening of juice-containing cells, more thorough and quicker segregation of juices from residual solids, and to provide a machine into which the juice-bearing materials can be fed and which will extract and separate the juices from the residual solids more completely and speedily, as well as to provide for controlling the comminution of the juice-bearing material and the separation of the juices from residual solids.

Another object of the invention is to reduce or comminute fruits or vegetables to such an extent that more flavoring, vitamin, and other nutritional values normally present in the liquid or solid state in the fruits or vegetables will be liberated into the juices.

Other objects and advantages reside in the detail construction of the invention, which is designed for simplicity, economy, and efficiency. These will become more apparent from the following description.

In the following detailed description of the invention reference is had to the accompanying drawings which form a part thereof. Like numerals refer to like parts in all views of the drawings and throughout the description.

In the drawings:

Fig. 1 is a vertical section through one form of the improved juice extractor.

Fig. 2 is a horizontal section therethrough, taken on the line 2—2, Fig. 1.

Fig. 3 is a similar section, taken on the line 3—3, Fig. 1.

Fig. 4 is a similar section, taken on the line 4—4, Fig. 1.

Fig. 5 is an enlarged detail section through one of the rotor ribs of the form of Fig. 1.

Fig. 6 is an enlarged detail section, taken on the line 6—6, Fig. 8.

Fig. 7 is an enlarged detail section, illustrating one of the rotor ribs and a double screen arrangement.

Fig. 8 illustrates a vertical section through an alternate form of the invention.

This invention is designed as an improvement on applicant's extractor shown in Patent No. 2,054,342, dated September 15, 1936. The machine of such patent is primarily designed to obtain a pulpless juice, and, like it, this invention is applicable to the release and extraction of liquids generally, particularly when entrapped in solids, as for example, within cell walls. The word "juice" and its derivatives is used in the appended claims to cover such liquids generally. The present invention will produce such a juice, but can be also regulated to place desired amounts of pulp in the juice or simultaneously produce several grades of juices of various amounts of pulp content.

The present invention employs a supporting frame 10 upon which a feed inlet casting 11 is supported. The casting 11 may support a motor base 12, upon which a suitable driving motor may be mounted. The rotor of the invention consists of an open bottomed, bell-shaped rotor 13 preferably formed integrally with a concentric, upwardly extending rotor shaft 14. The shaft 14 terminates in a shaft collar 15, to which a motor shaft 16 may be secured.

At the bottom of the frame 10 is a bearing spider 17, provided at its middle with a suitable ball bearing 18. The bottom of the rotor bell 13 is closed by means of a bearing plate 19, from which a stub shaft 20 projects downwardly into the bearing 18. An aligning bearing 21 for the shaft 14 is carried on the feed casting 11.

It is desired to call attention to the fact that the rotor 13 is formed with a series of sections or steps of increasing diameters, as the bottom is approached, which give different stages of action on the juice. As illustrated, the rotor is provided with two stages 22 and 23. It could, if desired, be increased in length, and have additional stages or diameters. Each stage of the rotor is provided with a series of ribs 24 which are inclined on a gradual spiral about the rotor. The ribs 24 of each stage terminate at their bottom in an outwardly extending conical shelf 25, which directs the pulp onto the next lower stage.

The first stage 22 is surrounded by a downwardly extending juice skirt 26 which in turn surrounds a cylindrical screen 27. The lower edge of the screen 27 terminates on a conical, annular shredding bur 28, from which a second screen 29 extends downwardly about the second stage 23.

The second screen 29 is surrounded by a second, downwardly extending skirt 30 which directs the juices passing through the screen 29 downwardly into a juice channel 31 surrounding the bearing spider 17. The juice is led from the channel 31 through any suitable juice conduits 32.

The inclined shelf 25 of the rotor is positioned opposite the shredding bur 28 and at this point is provided with a series of small shredding teeth 33. On the top of the rotor 13, a series of radial shredder blades 34 are positioned and immediately below these blades are a series of shredder teeth 35. The blades 34 and the teeth 35 are positioned opposite a vertically grooved, shredding ring 36 carried in the frame 10.

The skirts 26 and 30 serve to back up the screens 27 and 29 to prevent undue pressure from forcing these screens outwardly. Since the skirts must bear against the screens, they are provided with a series of closely spaced, juice channels 37 which serve to allow the juice to pass through the screens.

In use, the fruit or other material from which the juice is to be extracted is fed into the feed casting 11 from any suitable supply conduit. The first shredding blades 34 cut the fruit into rather coarse pieces without producing fine pulp. These pieces are sufficiently fine, however, to allow the juice to be easily expelled. These coarse fruit particles then pass through between the shredding teeth 35 and the shredding ring 36 which still further reduce their size and open the juice cells.

From here, they pass into a space which is free from ribs, indicated in Fig. 1 by the numeral 38 from where they are picked up by the ribs 24. The forward faces of the ribs 24 are inclined relative to the radius of the rotor at a fixed angle as shown at 57 in Fig. 5. This inclined face acts to counter-balance the centrifugal force and retain the heavier solids and stringy fibers and direct these downwardly onto the inclined shelf 25 of the second shredder.

The material entering the first stage is carried around the periphery for only a fraction of a revolution. This avoids breaking up the finer fruit cells on the screen and thus prevents forcing the fine pulp through the screen. The material after entering the first stage is immediately separated into three classifications, heavy stringy solids, which remain on the ribs of the rotor and are carried immediately to the second shredder; fine stringy solids which are deposited on the inner face of the screen; and the pure juice itself which passes immediately through the screen.

The accumulation of the fine solids on the screen builds up to a thickness sufficient to prevent forcing the pulp through the screen. When this accumulation reaches an excess thickness the ribs of the rotor scrape it from place and force it downwardly while new material immediately collects on the screen and the process repeats itself. This fine layer of solids acts as a filter for the expelled juice and prevents an excess of fine pulp passing through the screen.

The heavier solids upon reaching the second shredder between the ribs 33 and the grinding bur 28 are ground still finer so as to break up additional fruit cells and liberate additional juice. The fineness of grinding at this point can be regulated by raising or lowering the rotor. The broken up solids then pass to the second stage 23 where the process of the first stage is repeated.

The juice passing through the screen runs down the juice channels 37 in the skirts 26 and 30. The juice from the first stage can be collected from a separate juice channel 39 while the juice from the second stage is collected from the channel 31, should a classification of the juices be desired, or both juices may be allowed to flow to the channel 31 through an outer juice shell 40 if desired.

The pulp passes from the final stage 23 through a pulp throat 41 between the lower extremity of the rotor and a lower screen band 42. It then drops through the spider 17 to any suitable collector. The passage space of the pulp throat 41 is controlled by the size of the bearing plate 19 so as to hold the pulp back until the required percentage of juice has been extracted. If this pulp throat is relatively narrow, the pulp will be held back to build up a pressure behind the final screen for the extreme extraction of juice.

In Figs. 6, 7, and 8, a slightly alternate form of the invention is illustrated. In this form, the first extraction stage of the rotor is indicated at 43, and the second stage at 44. The rotor is surrounded by a plurality of annular shells such as indicated at 45, 46, and 47. The lower shells such as those shown at 46, and 47 each are formed with a peripheral juice channel 48 from which suitable pipe outlets 49 lead. These shells are preferably formed in two halves bolted together around the rotor by means of suitable clamp bolts 50.

Each shell contacts the lower edge of a screen 51 within the shell above it, and each juice channel 48 receives the juice from the screen above it. This construction makes a very flexible arrangement which will allow any desired number of juice channels and screens to be placed about the rotor so as to separate any desired number of different grades of juice.

The screens 51 can be of different mesh, for instance the upper screen may be of very fine mesh, and the lower screens of increasingly coarse mesh. This will produce a clear juice at the top of the machine of an exceedingly fine clarity and a coarser juice at the bottom with a large amount of pulp.

In this form the rotor stages are provided with hooked or grooved ribs 52, the grooves being on the forward face of each rib, as shown in Figs. 6 and 7. These grooves provide channels for holding the coarser pulp and carrying it rapidly to the bottom of the machine. They also serve as efficient scrapers to scrape down the layer of pulp on the screens to a constant uniform thickness.

This form also is provided with an adjustment for the pulp discharge throat. This adjustment comprises cutting a series of notches 53 in the lower periphery of the rotor, there being one notch immediately ahead of each rib. A control ring 54 surrounds the bottom bearing plate of the rotor. The control ring is provided with registering notches 55 which can be brought into realignment with the notches 53 to allow a full opening thereof, or which can be brought out of alignment to partially close this opening as indicated in Fig. 6. This enables the operator to adjust the control ring 54 to hold back the pulp so that it will be expelled with any desired degree of pressure to obtain the quality and quantity of juice desired.

When an exceedingly fine screen is used, it has not sufficient stability to withstand the internal pressure. In such a case, it is preferably backed up by means of a coarse screen as indicated at 56 in Fig. 7.

The machine illustrated in Fig. 1 gives two juice classifications. The machine illustrated in Fig. 8 gives three juice classifications. It is desired to be understood that by increasing the length of the rotor or by increasing the number of shells 46 and screens about the rotor, any desired number of classifications may be obtained.

Many advantages accrue from the structure of the machine and from the nature of the invention. For example, comminution of the material to free the juice normally retained within the juice cells and separation of such juice are both made speedier and more complete. Comminution to a very fine degree in a single comminution step requires subjection thereto of the material being comminuted for a longer period of time than is necessary to get the same or better results with the present invention. The series of steps of partial comminution to a suitable degree, forced separation of the freed juice, and then a repeated comminution step, make the comminution much speedier and more complete than would be the case with only a single comminution step. This is because the juice which, by its presence interferes with the single step comminution, is not present along toward the end of comminuting, that is, in the subsequent comminuting step, and because the volume of material passing through the subsequent comminution stage is lessened by the removal of the freed juice.

Forcing the separation of the juices from the residual solids makes such separation much speedier and more complete. This is of very great importance between comminuting steps, because it prepares the material which was comminuted in an earlier comminution step very speedily for comminution in the subsequent comminution step, and thus aids a small machine to produce very speedily a great output and also to extract the juices more thoroughly. This forced separation is important also in the separation of juices from residual solids after the last comminution stage because it speeds the separation and permits the speedy removal of residual solids from the machine. Thus, the time required for comminution is reduced as is the time required for separation of the freed juice, and both are made more complete. The combination of both results not only in lessening the time required for the recovery of the juices, but also in recovery of greater amounts of juices. Some juices, it should be emphasized, particularly some potable nutritional juices and perhaps others also, should contain certain solid nutritional material in very finely divided form as well as the liquid portion of the juice.

The ribs 24 and 52, and ribs similar thereto in whatever modification or stage they may present, rotate with the rotor and with respect to the screen surrounding them, and also with respect to the layer of comminuted solids built up on the screen and which acts as a filter. The ribs at the high operating speed of the machine, centrifuge material resulting from the comminution step and throw it obliquely and forcibly against the inner face of such filtering layer by their centrifugal effect thereon. The velocity thus imparted to the juices aids the juices to speedily penetrate the filtering layer and pass to the outside of the screen, and it may cause some erosion of the filtering layer, particularly since the impact is oblique to the inner face thereof.

Such ribs urge the material downwardly against the resistance due to the restricted size of the throat outlet for the solid residues, and a similar effect may be due to the blades 34 or blades similar thereto in conjunction with the restricted outlet. This results in setting up a pressure zone in which the material is compressed in a juice separation stage after such material has been comminuted and in which it is compressed while being comminuted. The compression aids in the separation of the liberated juice from the residual solids. The combination of such ribs which are within a juice separation stage with the restricted outlet for the residual solids creates pressure to compress the material within that stage. The same combination of parts exerts pressure on material in a later juice separation stage because such later stage is within the pressure zone formed by such combination. Likewise, the same combination of parts exerts pressure on material undergoing comminution in a later comminuting stage because such stage is also within such pressure zone. Furthermore, considering the blades 34 and the restricted outlet for the residual solids as the combination means for producing a pressure zone, all comminution stages and juice separating stages therebetween will be in such pressure zone.

The degree of pressure applied can be varied and controlled by adjustment of the adjustable outlet for the residual solids. Not only does the pressure compress the material in the juice separation stage, but that same application of pressure is reflected back and so coordinated as to compress the material both while and after being subjected to comminution. The pressure has its effect on the comminution which may accordingly be varied and controlled by adjustment of the pressure.

Another advantage is that the space between the cooperating elements of a comminuting stage will be filled and bridged over by the mass therein, and if such mass is wet enough, which is the case with most fruits and vegetables, it will form what amounts to a liquid seal between the cooperating comminuting elements. As will be apparent by inspection of Fig. 1, for example, the liquid seal between the cooperating comminuting elements 35 and 36 prevents access of much air to the material after the inside thereof is exposed and consequent substantial loss by oxidation of vitamins or flavoring or other food materials present, so that the resulting juice is of better quality.

Some other advantages of the machine are that it can operate continuously, and that it is not necessary to stop the machine to remove residual solids because they are automatically expelled from the machine as the operation continues.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A juice extractor comprising: a vertically mounted rotor; a series of successive cylindrical surfaces on said rotor, the diameter of said successive surfaces increasing as the bottom of said rotor is approached; a screen surrounding each of said surfaces, said screens also increasing in diameter as the bottom is approached; peripheral juice channels surrounding said screens to collect the juices passing therethrough; ribs projecting from each of said surfaces, said ribs being inclined so as to direct material downwardly as said rotor rotates; a conical portion surrounding said rotor and connecting a surface of one diameter to the next lower surface of greater diameter; and ribs extending from said conical portion.

2. A juice extractor comprising: a vertically mounted rotor; a series of successive cylindrical surfaces on said rotor, the diameter of said successive surfaces increasing as the bottom of said rotor is approached; a screen surrounding each of said surfaces, said screens also increasing in diameter as the bottom is approached; peripheral juice channels surrounding said screens to collect the juices passing therethrough; ribs projecting from each of said surfaces, said ribs being inclined so as to direct material downwardly as said rotor rotates; a conical portion surrounding said rotor and connecting a surface of one diameter to the next lower surface of greater diameter; ribs extending from said conical portion; and an annular grinding bur positioned about said conical portion so as to impart a shredding action on material passing from one cylindrical surface to the adjacent cylindrical surface.

3. A juice extractor comprising: a vertically mounted rotor; a series of successive cylindrical surfaces on said rotor, the diameter of said successive surfaces increasing as the bottom of said rotor is approached; a screen surrounding each of said surfaces, said screens also increasing in diameter as the bottom is approached; and peripheral juice channels surrounding said screens to collect the juices passing therethrough; ribs projecting from each of said surfaces, said ribs being inclined so as to direct material downwardly as said rotor rotates; a cylindrical skirt surrounding each of said screens; vertical ribs on the inner faces of each of said skirts forming vertical juice channels therein; and means for collecting the juice flowing from said skirts.

4. A juice extractor comprising: a supporting frame; an annular band at the top of said supporting frame; a feed chamber supported above said band; a bearing spider supported in said frame below said band; an axial bearing carried by said bearing spider; a bell-shaped rotor positioned in said frame; a bearing plate closing the bottom of said rotor; a shaft extending from said bearing plate downward into said bearing; a vertical rotor shaft extending upwardly from said rotor through said feed chamber; said rotor having two cylindrical surfaces, the lowermost surface being of a large diameter; a screen surrounding each of said surfaces; a juice collecting skirt surrounding each of said screens; and a juice channel for independently receiving the juice from each of said skirts.

5. A juice extractor comprising: a supporting frame; an annular band at the top of said supporting frame; a feed chamber supported above said band; a bearing spider supported in said frame below said band; an axial bearing carried by said bearing spider; a bell-shaped rotor positioned in said frame; a bearing plate closing the bottom of said rotor; a shaft extending from said bearing plate downward into said bearing; a vertical rotor shaft extending upwardly from said rotor through said feed chamber; said rotor having two cylindrical surfaces, the lowermost surface being of a larger diameter; a screen surrounding each of said surfaces; a juice collecting skirt surrounding each of said screens; a juice channel for independently receiving the juice from each of said skirts; an annular grinding member surrounding said rotor between said screens; and a conical bladed surface formed on said rotor opposite said grinding member and between the cylindrical surfaces thereof.

6. In a juice extractor having a cylindrical, bladed, rotary drum, means for obtaining a classification of the juices extracted therefrom comprising: a vertical series of cylindrical members surrounding said drum; a screen carried by each of said members around said drum; and means for independently collecting the juices which pass through each of said screens; a juice channel about each of said members; a passage for conducting the juice of the next above member to the juice channel of the next below member; means for drawing off the juice from each of said channels; an upper cylindrical surface on said rotary drum; a lower cylindrical surface on said rotary drum of a larger diameter than the upper cylindrical surface thereof; a conical shelf connecting said two surfaces; and an annular grinding member surrounding said conical shelf.

7. In a juice extractor having a cylindrical, bladed, rotary drum, means for obtaining a classification of the juices extracted therefrom comprising: a vertical series of cylindrical members surrounding said drum; a screen carried by each of said members around said drum; and means for independently collecting the juices which pass through each of said screens; and a series of inclined ribs formed on said drum, each of said ribs having a longitudinal groove in its forward face.

8. In a juice extractor having a vertical, rotary, ribbed drum within a cylindrical screen; means for retarding material from passing from between said screen and said drum comprising: a projecting lower extremity on said drum; a coacting annular surface about said projecting portion so as to provide a restricted annular passage about the lower extremity of said drum; means for varying the opening of said passage comprising a series of vertical grooves formed in said projecting portion; and a rotary annular ring having coacting grooves by means of which the opening of the grooves of said projecting portion may be controlled.

9. A machine for extracting juice from pulp comprising; a vertically mounted cylindrical rotor; a plurality of connected, cylindrical surfaces on said rotor, the diameter of each successive surface, as the bottom of said rotor is approached, being greater than that of the next above surface; a connecting surface connecting the adjacent cylindrical surfaces; a stationary cylindrical screen spaced from and surrounding each of said cylindrical surfaces; means for collecting the juice passing through said screen; means connecting said screens and spaced from said connecting surface to provide a continuous passage for pulp from one surface to the next lower surface.

10. In a machine for extracting juice from pulp comprising: a vertically mounted cylindrical rotor; a casing surrounding said rotor; a plurality of connected, cylindrical surfaces on said rotor, the diameter of each successive surface, as the bottom of said rotor is approached, being greater than that of the next above surface; a connecting surface connecting the adjacent cylindrical surfaces so as to provide a continuous passage for said pulp downwardly over said surfaces; spaced-apart ribs projecting from said cylindrical surfaces, said ribs extending downwardly and rearwardly from the direction of rotation so that as said rotor rotates they will act to force the pulp downwardly.

11. A machine for extracting juice from pulp comprising: a vertically mounted cylindrical rotor; a casing surrounding said rotor; a plurality of connected, cylindrical surfaces on said rotor, the diameter of each successive surface, as the bottom of said rotor is approached, being greater than that of the next above surface; an outwardly flaring surface connecting the adjacent cylindrical surfaces so as to provide a continuous passage for the pulp downwardly over said surfaces; and coacting means on said casing and rotor between the cylindrical surfaces to exert a shredding action on the pulp as it travels from one cylindrical surface to the next.

12. A rotor for juice extractors of the type described comprising: a vertically mounted rotatable drum of less diameter at its top than at its bottom, the upper diameter being continued downwardly on said drum to form an upper cylindrical portion, the lower diameter being continued upwardly on said drum to form a lower cylindrical portion; a conical portion joining said two upper and lower portions together and shredding means carried by said conical portion for shredding material passing from the upper to the lower portions.

13. A juice extractor of the type described comprising: a casing; a vertically mounted rotatable drum within said casing, said drum having a less diameter at its top than at its bottom, the upper diameter being continued downwardly on said drum to form an upper cylindrical portion, the lower diameter being continued upwardly on said drum to form a lower cylindrical portion; a conical portion joining said two upper and lower portions together; shredding means carried by said conical portion coacting with means on said casing for shredding material passing from the upper to the lower portions; and adjustable means at the lower extremity of said drum coacting with said drum and said casing for controlling the discharge of pulp from said extractor.

14. A juice extractor comprising: a vertically mounted rotor; a series of successive cylindrical surfaces increasing in diameter as the bottom of said rotor is approached; a screen surrounding each of said surfaces, said screens also increasing in diameter as the bottom is approached; ribs projecting from each of said surfaces, said ribs being inclined so as to direct material downwardly as said rotor rotates; a conical portion surrounding said rotor and connecting a surface of one diameter to the next lower surface of greater diameter; and ribs extending from said conical portion.

15. In a juice extractor of the class described, a rotary drum; ribs projecting outwardly from said drum; and a cylindrical screen surrounding said ribs, said ribs each having a longitudinal concavity in their forward face to hold back the pulp from said screens, and to form scoop-like cutting faces.

16. A juice extractor comprising: a rotor having one end higher than the other, cutters on said rotor and so inclined with respect thereto that the upper ends of said cutters are forwardly of the lower ends thereof in the direction of rotation of said rotor, said cutters each forming a concavity forwardly thereof, and a screen about said rotor and cutters; whereby juice-bearing material will be subdivided and separated into a heavier fraction which moves downwardly in said concavities, a lighter fraction which is deposited on the inner face of the screen, and juice which passes through the screen.

17. A juice extractor comprising a rotor; a stator about and spaced from said rotor; comminuting means comprising a part on said rotor and a part on said stator, said parts being closely adjacent each other to form a narrow passage therebetween and cooperating with each other to finely comminute juice-bearing material passing therethrough; a screen about said rotor; and means to build up a filtering layer of resulting finely divided solid material on said screen and to limit the thickness thereof to a predetermined maximum less than the cross-sectional area between said rotor and screen, comprising means to move the resulting finely divided material longitudinally between said rotor and screen and means to rotate said rotor at a speed to actuate said finely dividing means and to throw said moving material by centrifugal action against said screen.

18. A juice extractor comprising: a series of cylindrical screens above each other, separate means to comminute material entering said screens, whirling means within said screens, a lower comminuting means and a lower whirling means having greater comminuting and whirling effects, respectively, than similar means thereabove, means to lead comminuted solid material remaining within an upper of said screens through a lower comminuting means into a lower of said screens after liquid therewith has passed through said upper screen, and means to lead liquids passing through said screens away from the remaining solid material.

19. A juice extractor comprising: a series of cylindrical screens above each other, separate means to comminute material entering said screens, whirling means within said screens, a lower comminuting means and a lower whirling means having greater comminuting and whirling effects, respectively, than similar means thereabove, means to lead comminuted solid material remaining within an upper of said screens through a lower communiting means into a lower of said screens after liquid therewith has passed through said upper screen, and peripheral juice channels surrounding said screens to collect the juices passing therethrough and lead them away from the solids remaining within said screens.

20. A juice extractor comprising: a series of cylindrical screens above each other, separate means to comminute material entering said screens, whirling means within said screens, a lower comminuting means and a lower whirling means having greater comminuting and whirling effects, respectively, than similar means thereabove, means to lead comminuted solid material remaining within an upper of said screens through a lower comminuting means into a lower of said screens after liquid therewith has passed through said upper screen, means to compress said led material while being comminuted, and means to lead liquids passing through said screens away from the remaining solid material.

21. A juice extractor comprising: means to comminute juice-bearing material, means to compress the resulting comminuted material, and means to coordinate said compressing means with said comminuting means to compress said material both while and after being subjected to said comminuting means.

22. In a juice extractor of the class described, a rotary drum, a rib projecting outwardly from said drum, and a cylindrical screen surrounding said drum and rib, said rib forming a longitudinal concavity at its forward face on a section transverse to said rib and sufficient in depth to hold back the pulp therein from being thrown against said screen by centrifugal force.

23. In a juice extractor, a rotor, a rib on said rotor crosswise of the direction of rotation thereof, a stator about said rib and said rotor, means for feeding comminuted juice-bearing material into the space between said rotor and stator, the face of said rib which is forward in the direction of rotation being inclined forwardly to form conjointly with the surface of the rotor a forward concavity transverse to the direction of rotation and of such depth as to be capable while rotating of retaining material between said rotor and the outer end of said rib, whereby, when said comminuted material is fed into said space between said stator and said rotor while rotating, due to centrifugal effect, said solids will have a greater tendency than said liquid to be retained in said concavity, and means to rotate said rotor and rib at a speed to produce said centrifugal effect.

24. In a juice extractor, a rotor, a rib on said rotor, a stator about said rib and said rotor, the face of said rib which is forward in the direction of rotation being inclined forwardly to form a forward concavity of such depth as to be capable while rotating of retaining material between said rotor and the outer end of said rib, whereby, when comminuted solids mixed with liquid are between said stator and said rotor while rotating, due to centrifugal effect, said solids will have a greater tendency than said liquid to be retained in said concavity, said face of said rib being oblique to the direction of rotation to direct said solid material along said concavity, and means to rotate said rotor and rib at a speed to produce said centrifugal effect.

25. In a juice extractor, a rotor, a screen about said rotor forming an annular space therebetween, a rib on said rotor in said space, the face of said rib which is forward in the direction of rotation being inclined forwardly to form a forward concavity of such depth as to be capable of retaining material at a locus between said rotor and the outer end of said rib while rotating, whereby, due to centrifugal effect, solids will have a greater tendency than liquid to be retained in said concavity, said face of said rib being oblique to the direction of rotation to direct said solid material along said concavity, means to rotate said rotor and rib at a speed to produce said centrifugal effect, said annular space leading to an exit passage, and means to adjustably restrict said exit passage.

26. The method of extracting juice from juice-bearing material, which comprises: treating said material to an earlier comminuting step to open some but not all of the juice cells and thereby free juice therein; removing by centrifuging sufficient of the free juice from the resulting mass to render solids therein easily comminutable; treating said solids to a later comminuting step to open still unopened juice cells to free juice therein; and removing by centrifuging juice freed by said later comminuting step.

27. The method of extracting juice from juice-bearing material, which comprises: treating said material to an earlier comminuting step to open some but not all of the juice cells and thereby free juice therein; removing by centrifuging sufficient of the free juice from the resulting mass to render solids therein easily comminutable; treating said solids to a later comminuting step to open still unopened juice cells to free juice therein while compensating for reduction in volume due to removal of juice; and removing by centrifuging the juice freed by said later comminuting step.

28. The method of extracting juice from juice-bearing material, which comprises: treating said material to an earlier comminuting step to open some but not all of the juice cells and thereby free juice therein; removing by centrifuging sufficient of the free juice from the resulting mass to render solids therein easily comminutable; treating said solids to a later comminuting step to open still unopened juice cells to free juice therein; removing by centrifuging juice freed by said later comminuting step; and preventing access to the materials treated and produced during said sequence of steps of air sufficient to deteriorate resulting juice.

29. The method of extracting juice from juice-bearing material, which comprises: grinding said material, immediately centrifuging the resulting ground mass to separate resulting coarser solids from resulting freely flowing juice, immediately grinding said solids to a finer degree than in said first mentioned grinding step, immediately centrifuging the resulting ground mass to separate resulting coarser solids from resulting freely flowing juice, moving the ground material substantially parallel to the axis of centrifuging during centrifuging, and restricting such movement of the material to create pressure other than the pressure incident to centrifuging and grinding.

30. A juice extractor comprising: a plurality of spaced centrifugal separating means comprising a rotor and a stator about and spaced from said rotor, means to lead off juices separated thereby, each separating means having means to forward solid material therethrough, means on said stator and rotor to comminute juice-bearing material and to forward the resulting comminuted material to a prior separating means, means on said stator and rotor to comminute more finely the solids forwarded through said prior separating means and to forward the resulting comminuted material to another said separating means, said last-mentioned separating means having an exit passage for the finally separated solids, and means to vary said exit passage to cause and control back pressure on the material undergoing treatment.

31. A centrifugal juice extractor comprising: a rotor; a stator about and spaced from said rotor; comminuting means comprising a part on said rotor and a part on said stator; means to move the comminuted material during rotation in a path away from said comminuting means substantially parallel to the axis of rotation; and means to adjust the pressure between said comminuting means and the material being comminuted thereby, comprising means to restrict such movement of the material to create pressure other than the pressure incident to centrifuging and comminuting.

32. A centrifugal juice extractor comprising: a rotor; a stator about and spaced from said rotor; comminuting means comprising a part on said rotor and a part on said stator, said parts being closely adjacent each other to form a narrow passage therebetween and cooperating with each other to finely comminute juice-bearing material passing therebetween; a screen about said rotor; means to move the comminuted material during rotation in a path away from said comminuting means through said screen substantially parallel to the axis of rotation; and means to adjust the pressure between said comminuting means and the material being comminuted thereby and the pressure exerted on the comminuted material within said screen, comprising means to restrict such movement of the material to create pressure other than the pressure incident to centrifuging and comminuting.

33. In a juice-extractor: an annular screen; means to finely comminute juice-bearing material, to feed the finely comminuted material into said screen, and to exclude coarse pieces therefrom; a rotor within said screen; a rib within said screen on said rotor to centrifuge mixed liquid and finely divided solids, the face of said rib which is forward in the direction of rotation being inclined to feed said material through said screen substantially parallel to the axis of centrifuging during centrifuging, the outer face of said rib being spaced from said screen to permit build-up on said screen of a filter bed of finely divided solid material only; and means to rotate said rotor and rib sufficiently fast to throw said moving material outwardly by centrifugal action.

HENRY G. SCHWARZ.